Dec. 18, 1951   R. KRAMER   2,579,082
TOOLHOLDER
Filed Feb. 9, 1950   2 SHEETS—SHEET 1
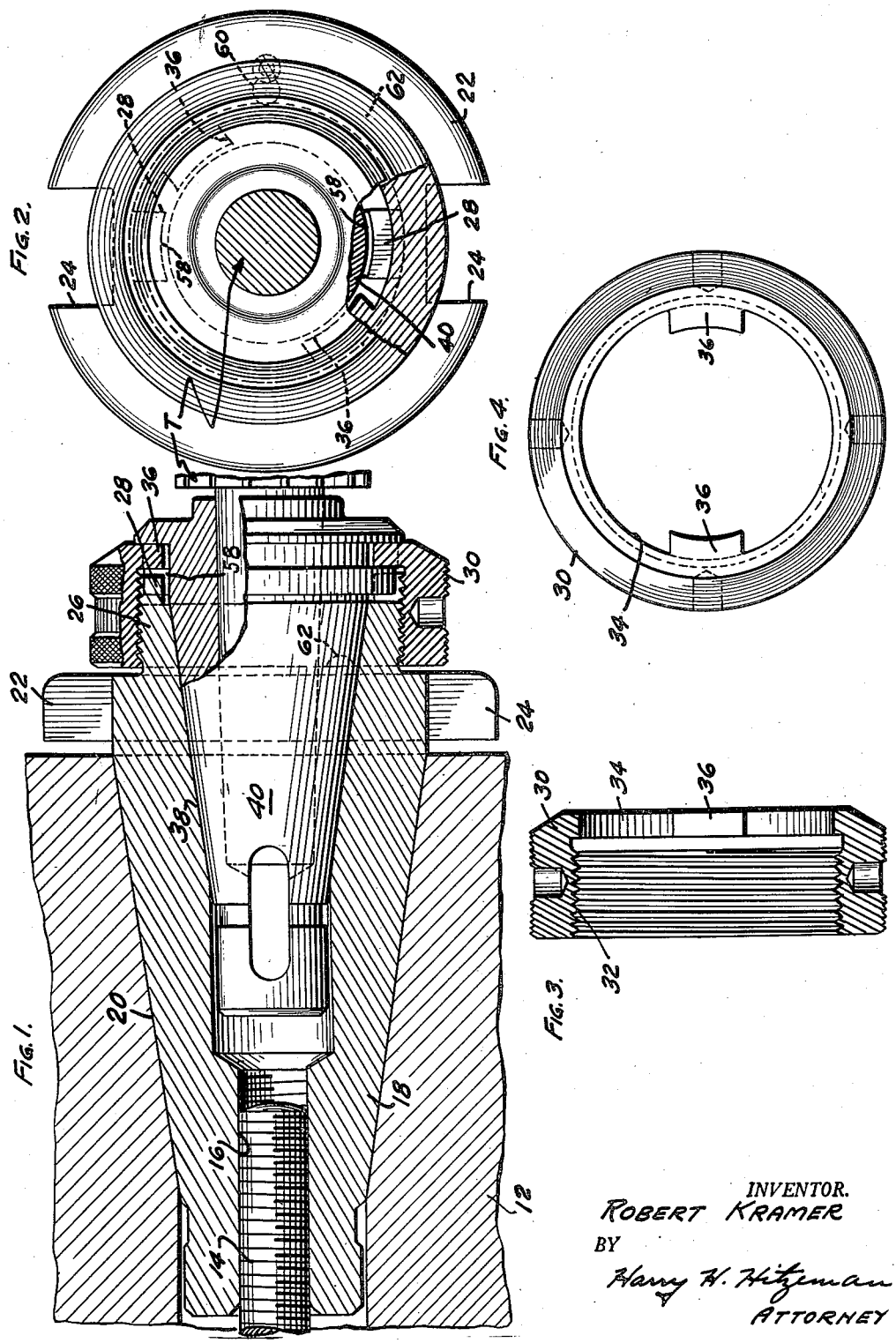
INVENTOR.
ROBERT KRAMER
BY
Harry H. Hitzeman
ATTORNEY

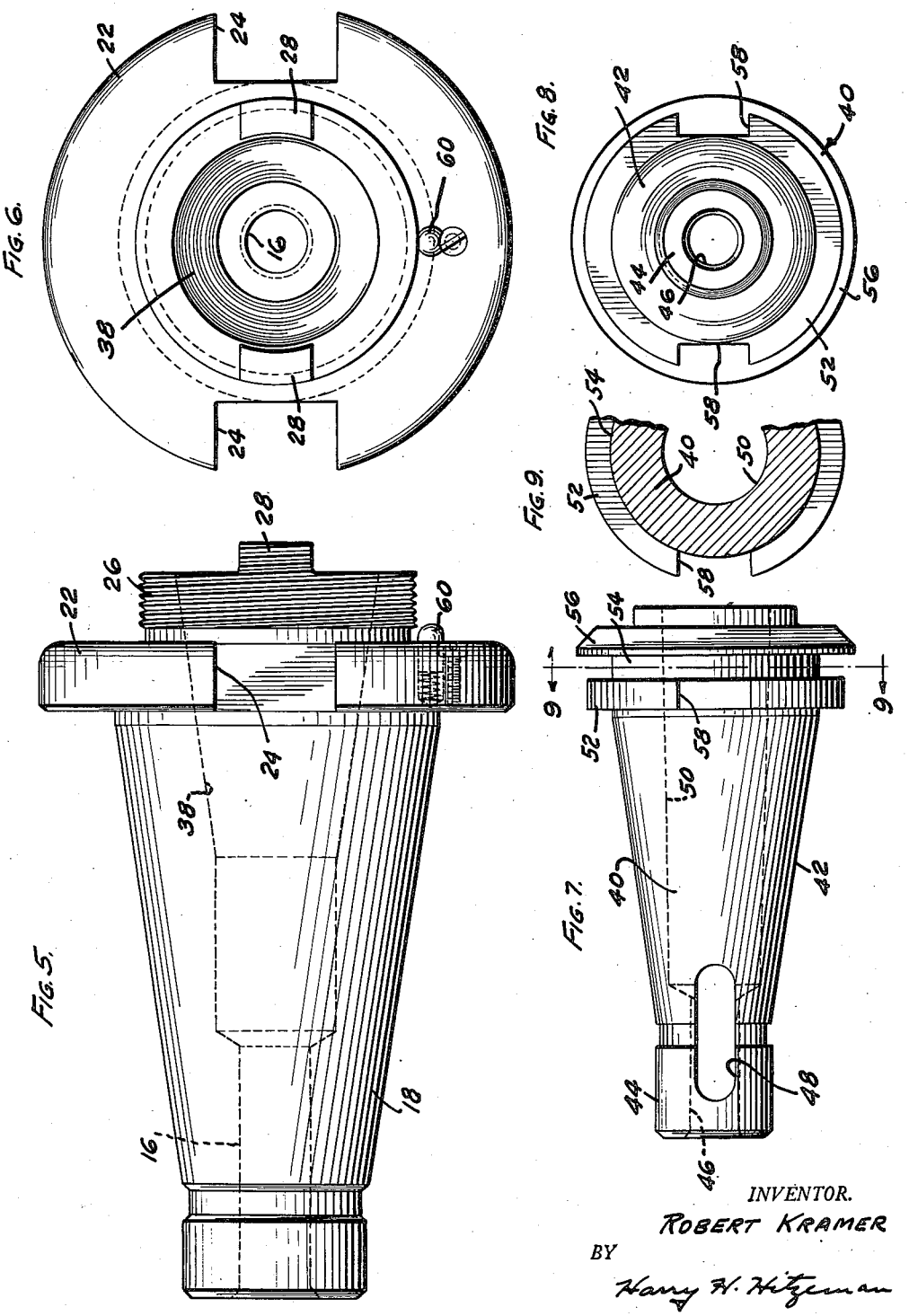

Patented Dec. 18, 1951

2,579,082

UNITED STATES PATENT OFFICE 2,579,082

TOOLHOLDER

Robert Kramer, Carpentersville, Ill.

Application February 9, 1950, Serial No. 143,182

4 Claims. (Cl. 279—103)

My invention relates to improvements in tool holders for milling and boring machines.

My invention relates more particularly to improvements in the construction of a combined chuck and arbor for tool holders and a collet holder interchangeable therein with standard taper spindles at present on the market.

Because of the loss of time involved in changing from one tool to another efforts have been made in the past to set standards for milling machine spindles. Spindle tapers, spindle nose diameters, drive keys, and bolt circle diameters have been standardized providing complete uniformity on modern milling machines.

This standardization permits interchangeability of arbors and face milling cutters. For example, the size taper is uniform and two of the standards most frequently used are taper spindles designated as No. 40 and No. 50 which are similar in that the standard 3½ inch per foot taper which allows instant release of the arbor is employed. However, the No. 40 spindle and the No. 50 spindle are different in that collet holders or arbors adapted to be held by one will not fit the other, thus causing loss of time when it becomes necessary to change from a No. 40 spindle to a No. 50.

An object of my invention is to provide an improved combined chuck and arbor capable of holding my improved special quick release tool holder shown herein.

A further object of the invention is to provide a special quick release tool holder capable of fitting either my improved chuck and arbor or a standard No. 40 spindle, and being interchangeable.

A further object of the invention is the provision of an improved combined chuck and arbor for use with milling machines which includes a tool holder instantly releasable from the arbor so that the time required for changing from one tool to another is greatly minimized.

A further object of the invention is to provide an improved combined chuck and arbor having locking means for the tool holder associated therewith, said locking means capable of audible signal when said means are unlocked to permit removal of the tool holder.

A further object of the invention is to provide an improved chuck or arbor having improved lock and release means for the tool holder and an improved construction of tool holder easily and quickly locked in position or removed, either in the combined chuck and arbor provided herewith, or in a standard No. 40 spindle.

Other objects and advantages will be more apparent from the following description wherein reference is had to the accompanying drawings, upon which Fig. 1 is a cross-sectional view through the fragment of a milling machine showing my improved tool holder in operative position therein holding a milling cutter;

Fig. 2 is a front elevational view thereof with portions broken in sections to more clearly show other parts;

Fig. 3 is a cross-sectional view of the locking nut;

Fig. 4 is a front elevational view of the same;

Fig. 5 is a side elevational view of the combined chuck and arbor which I employ;

Fig. 6 is a front view thereof;

Fig. 7 is a side elevational view of the removable and replaceable tool holder shown in the assembly of Fig. 1;

Fig. 8 is an end view of the same looking from the left of Fig. 7; and

Fig. 9 is a fragmentary cross-sectional view thereof taken on the line 9—9 of Fig. 7.

In the embodiment of the invention which I have chosen to illustrate and describe the same, I have shown the usual type of No. 50 milling machine tapered spindle 12 through which the draw-in bolt 14 may be extended to the tapped axial bore 16 of the combined chuck and arbor 18 that is mounted in the bore 20 of the tapered spindle 12.

The combined chuck and arbor 18 may be provided with a circular flange 22 having the usual aligned slots 24 to receive the usual driving members located on the front of the tapered spindle 12.

The forward end of the combined chuck and arbor may have a reduced screw-threaded portion 26 having a pair of forwardly extending lugs 28 thereon for a purpose which will be hereinafter apparent.

The locking collar 30 shown in Figs. 3 and 4 is provided with a tap 32 to screw-threadedly engage the portion 26 and is further provided with a reduced face opening 34 which has a pair of inwardly extending lug portions 36.

The combined chuck and arbor 18 has a tapered axial bore 38 to receive the tool holder 40 formed with a tapered shank 42, a reduced cylindrical end 44 having a screw-threaded axial bore 46 therein, and an elongated knock-out pin opening 48. The tool holder also has a comparatively long tapered bore 50 within which operating tools such as milling cutters, boring tools, etc., may be mounted for operation.

The forward end of the tool holder 40 is provided with a circular ledge 52, having a reduced circular extension 54 and an enlarged collar portion 56 forward from the same. The circular ledge 52 has a pair of lateral slots 58 therein, which in inserting the tool holder into the combined chuck and bore, pass over the extensions 28 on the screw-threaded portion 26 of the chuck and bore to receive them in a driving relation.

In this position the collar 30 which has a pair of lug portions 36 is screw-threadedly mounted on the portion 26 and as it is screwed forward to tighten the tool holder in position and is rotated until in a locking position that moves past the spring pressed plunger 60 to the position shown in Fig. 2, the tool holder will be locked in operative position. In this position all of the parts to the assembly are as shown in Fig. 1 and Fig. 2, and the operation of the milling cutter or other tool may be carried out.

In order to release the tool holder 40 so that it may be removed and another substituted, the locking collar 30 is rotated counter-clockwise until the lugs 36 are aligned with the slots 58 in the tool holder 40, at which time the spring pressed pin 60 in the face of flange 32 will click into the shallow cavity 62 in the face of locking collar 30, thus both audibly and by feel indicating the released position of the tool holder.

From the above and foregoing description it can be seen that the changing from one tool holder to another can be practically, instantaneously effected, and in the case of vertical spindle operation it is not necessary to see the condition of the locking collar in order to determine the locking or unlocking position; rather the same can be felt or heard.

Due to the size of the taper as previously mentioned in the combined chuck and arbor and its similarity to that of the No. 40 spindle, the same special tool holder may be employed in a No. 40 taper spindle, thus affording a quick change from a No. 40 to a No. 50 spindle equipped with my combined chuck and arbor.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. The combination for the tapered spindle of a milling machine including a combined chuck and arbor having an axial bore to receive the draw-in rod of the milling machine and a tapered shank complementary to the bore of said milling machine spindle, a lateral flange at the forward end of the same, a reduced screw-threaded portion extending forwardly therefrom, a pair of screw-threaded lugs extending forward from said screw-threaded portion, a tapered bore in said combined chuck and arbor, a tool holder capable of being positioned therein, said tool holder having a forward lateral flange, a pair of slots therein adapted to fit over the end of said combined chuck and arbor lugs, a locking collar for holding the same in an operative position, said locking collar capable of releasing said tool holder upon a partial rotation of the same, and an audible signal associated therewith and operable upon a partial rotation of said collar.

2. The combination for the tapered spindle of a milling machine including a combined chuck and arbor having and axial bore to receive the draw-in rod of the milling machine and a tapered shank complementary to the bore of said milling machine spindle, a lateral flange at the forward end of the same, a reduced screw-threaded portion extending forwardly therefrom, a pair of screw-threaded lugs extending forwardly therefrom, a pair of screw-threaded lugs extending forward from said screw-threaded portion, a tool holder capable of positioning in said combined chuck and arbor, said tool holder having a forward lateral flange, a pair of slots therein adapted to fit over said lugs, and a locking collar for holding the same in operative position, said tool holder removable upon a partial rotation of said locking collar.

3. The combination for the tapered spindle of a milling machine including a combined chuck and arbor having an axial bore to receive the draw-in rod of the milling machine and a tapered shank complementary to the bore of said milling machine spindle, a lateral flange at the forward end of the same, a reduced screw-threaded portion extending forwardly therefrom, a pair of radially opposed screw-threaded lugs extending forward from said screw-threaded portion, a tapered bore in said combined chuck and arbor, a tool holder capable of being positioned therein, said tool holder having a forward lateral flange, a pair of slots therein adapted to fit over the end of said combined chuck and arbor lugs, and a locking collar for holding the same in operative position.

4. The combination for the tapered spindle of a milling machine including a combined chuck and arbor having an axial bore to receive the draw-in rod of the milling machine and a tapered shank complementary to the bore of said milling machine spindle, a lateral flange at the forward end of the same, a reduced screw-threaded portion extending forwardly therefrom, a pair of radially opposed screw-threaded lugs extending forward from said screw-threaded portion, a tapered bore in said combined chuck and arbor, a tool holder capable of being positioned therein, said tool holder having a forward lateral flange, a pair of slots therein adapted to fit over the end of said combined chuck and arbor lugs, and a locking collar for holding the same in operative position, said locking collar having inwardly extending radial lugs adapted to engage behind said lateral flange.

ROBERT KRAMER.

REFERENCES CITED

The following references are of record in the file of this patent:

UNITED STATES PATENTS

| Number | Name | Date |
|---|---|---|
| 717,199 | Hollin | Dec. 30, 1902 |
| 802,247 | Troxel | Oct. 17, 1905 |
| 1,041,338 | Palmgren | Oct. 15, 1912 |
| 1,157,513 | Dampier | Oct. 19, 1915 |
| 1,618,998 | Redinger | Mar. 1, 1927 |
| 1,934,415 | Fisher | Nov. 7, 1933 |
| 2,039,855 | Stone | May 5, 1936 |